US008065977B1

(12) United States Patent
Wilks

(10) Patent No.: US 8,065,977 B1
(45) Date of Patent: Nov. 29, 2011

(54) FELINE EXERCISE APPARATUS

(76) Inventor: Evonne Wilks, Fresno, CA (US)

(*) Notice: Subject to any disclaimer, the term of this patent is extended or adjusted under 35 U.S.C. 154(b) by 242 days.

(21) Appl. No.: 12/419,966

(22) Filed: Apr. 7, 2009

(51) Int. Cl.
A01K 29/00 (2006.01)
A01K 15/02 (2006.01)

(52) U.S. Cl. .......... 119/706; 119/705; 119/28.5

(58) Field of Classification Search .......... 119/28.5, 119/705, 706; A01K 15/02, 29/00
See application file for complete search history.

(56) References Cited

U.S. PATENT DOCUMENTS

| 3,085,551 | A |   | 4/1963  | Helmer              |         |
|-----------|---|---|---------|---------------------|---------|
| D254,813  | S |   | 4/1980  | Kossar              |         |
| 4,539,936 | A |   | 9/1985  | Majewski            |         |
| 4,576,116 | A | * | 3/1986  | Binkert             | 119/498 |
| 5,247,902 | A | * | 9/1993  | Williams            | 119/706 |
| 5,275,128 | A |   | 1/1994  | Barnes              |         |
| D344,613  | S | * | 2/1994  | Cromwell            | D30/160 |
| 5,379,552 | A |   | 1/1995  | Smith               |         |
| 5,450,819 | A |   | 9/1995  | Gray et al.         |         |
| 5,474,026 | A |   | 12/1995 | Wohltjen            |         |
| 5,474,032 | A |   | 12/1995 | Krietzman et al.    |         |
| 5,829,390 | A |   | 11/1998 | Janilla et al.      |         |
| D555,299  | S | * | 11/2007 | Tsengas             | D30/160 |
| 2005/0067549 | A1 | * | 3/2005 | Kintzele et al.  | 248/690 |
| 2008/0066686 | A1 | * | 3/2008 | Lockwood et al.  | 119/28.5 |
| 2009/0050072 | A1 | * | 2/2009 | Moser et al.     | 119/706 |
| 2009/0283054 | A1 | * | 11/2009 | Reyes            | 119/708 |
| 2010/0199921 | A1 | * | 8/2010 | Haaf et al.      | 119/706 |

* cited by examiner

Primary Examiner — Rob Swiatek
Assistant Examiner — Kathryn L Thompson
(74) Attorney, Agent, or Firm — Crossley Patent Law; Mark A. Crossley

(57) ABSTRACT

The feline exercise apparatus removably hooks over a door and provides a pair of vertically hung carpet like sections for a cat to climb and scratch. The bottom section removably affixes to the top section. Either section can be rolled and hooked to itself to form a cylindrical tunnel, whether hung from the door or detached. A pair of hanging members are also optionally attached.

1 Claim, 4 Drawing Sheets

FELINE EXERCISE APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Cats are known to be playful, and with that personality trait, sometimes destructive regarding furniture, carpet and other household items. The present apparatus provides an alternative to destructive behavior. The apparatus provides a large surface upon which a cat can scratch and climb, a detachable bottom section that offers more play activity including a selectively formed tunnel, and hanging members that further entertain.

FIELD OF THE INVENTION

The feline exercise apparatus relates to pet exercise devices and more especially to a feline exercise apparatus that removably hangs from a door, covers a substantial majority of the door, and provides an alternative to a cat's potentially destructive behavior.

SUMMARY OF THE INVENTION

The general purpose of the feline exercise apparatus, described subsequently in greater detail, is to provide a feline exercise apparatus which has many novel features that result in an improved feline exercise apparatus which is not anticipated, rendered obvious, suggested, or even implied by prior art, either alone or in combination thereof.

To attain this, the feline exercise apparatus provides more than one entertainment feature so that a cat is not tempted to seek other outlets for typical feline behavior. The apparatus further substantially covers a door, providing sufficient entertainment space. The top section is about 48 inches long and about 24 inches wide. The bottom section is about 24 inches long and the same in width. A majority of most doors can therefore be covered with the application of the apparatus. Additionally, two hanging members are provided, with different sizes balls on the bottom of each, so that a cat can bat at the devices for further involvement. The hanging members can be hung from the top hooks with which the apparatus is hung from a door, or from lower carabiners to entice a cat to involve itself with the apparatus, or from both. The front of both the top section and the bottom section is made from a variety of typically carpet like materials, all providing a surface into which a cat can sink its claws in order to climb and scratch. The bottom section is selectively hooked to the bottom of the top sections via grommets into which are selectively fastened carabiners. Carabiners do not offer any edges onto that might injure a cat or harm a door.

Further, the bottom section can be hooked back to itself in order to create a tunnel into which a cat can hide, as cats are prone to do, whether attached or detached from the top section. Additionally, the top section top can be hooked to the top section bottom via the carabiners. The hooks instantly hook over the top of a door and are thin so that opening and closing of the door is not impinged. Instant removability enables the apparatus to be stored when its presence is unwanted. The flexibility of the sections provide for rolling up the apparatus for storage.

The rubberized backs of the sections ensure that claws do not fully penetrate the apparatus and harm a door.

Thus has been broadly outlined the more important features of the improved feline exercise apparatus so that the detailed description thereof that follows may be better understood and in order that the present contribution to the art may be better appreciated.

An object of the feline exercise apparatus is to prevent destruction of household items by a cat.

Another object of the feline exercise apparatus is to provide an outlet for a cat's scratching nature.

A further object of the feline exercise apparatus is to entertain a cat.

An added object of the feline exercise apparatus is to optionally provide a hiding place for a cat.

And, an object of the feline exercise apparatus is to be instantly hung and removed from a door.

Yet another object of the feline exercise apparatus is to provide a vertical climbing surface for a cat.

Still another object of the feline exercise apparatus is to negate interference with opening and closing of a door.

And, an object of the feline exercise apparatus is to be quickly stored and employed.

These together with additional objects, features and advantages of the improved feline exercise apparatus will be readily apparent to those of ordinary skill in the art upon reading the following detailed description of presently preferred, but nonetheless illustrative, embodiments of the improved feline exercise apparatus when taken in conjunction with the accompanying drawings.

In this respect, before explaining the current embodiments of the improved feline exercise apparatus in detail, it is to be understood that the feline exercise apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved feline exercise apparatus. It is therefore important that the claims be regarded as including such equivalent constructions insofar as they do not depart from the spirit and scope of the feline exercise apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the feline exercise apparatus generally designated by the reference number 10 will be described.

Figure 1:
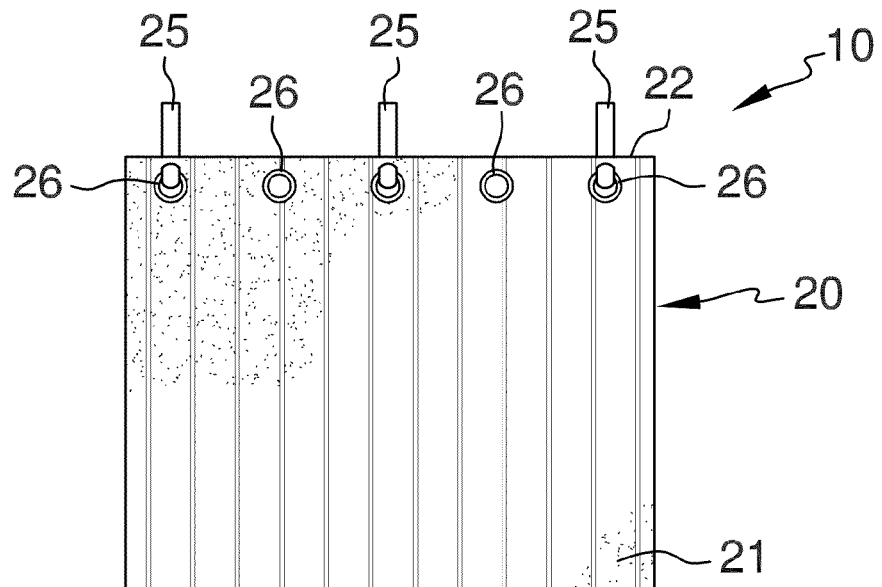
FIG. 1 is a front elevation view.
Figure 1:
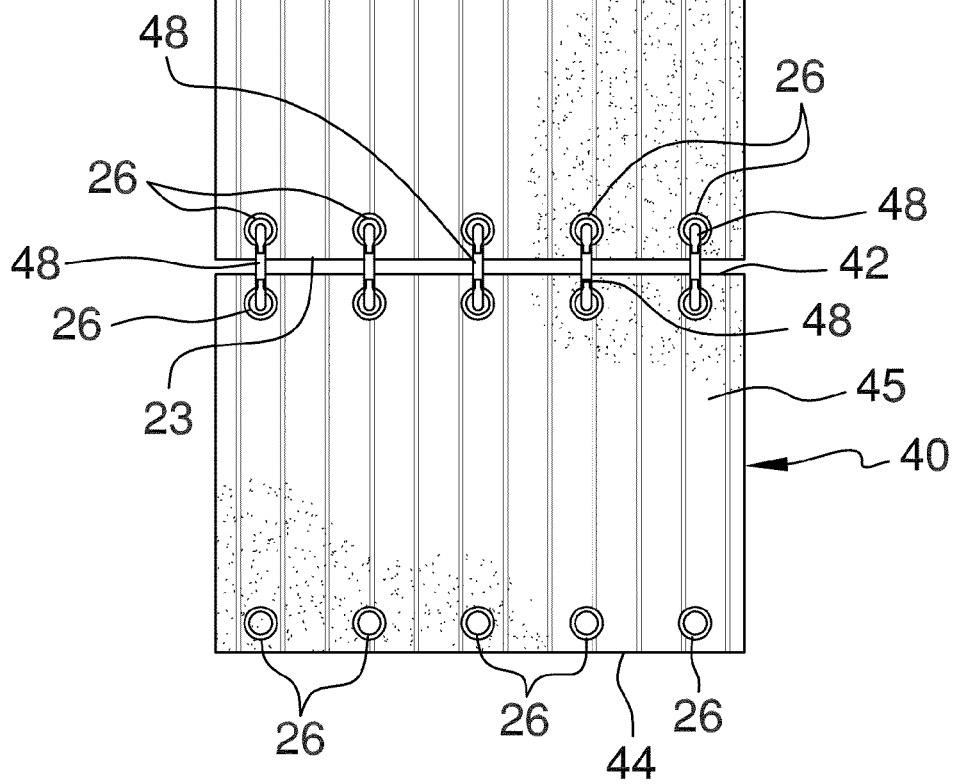
Figure 2:
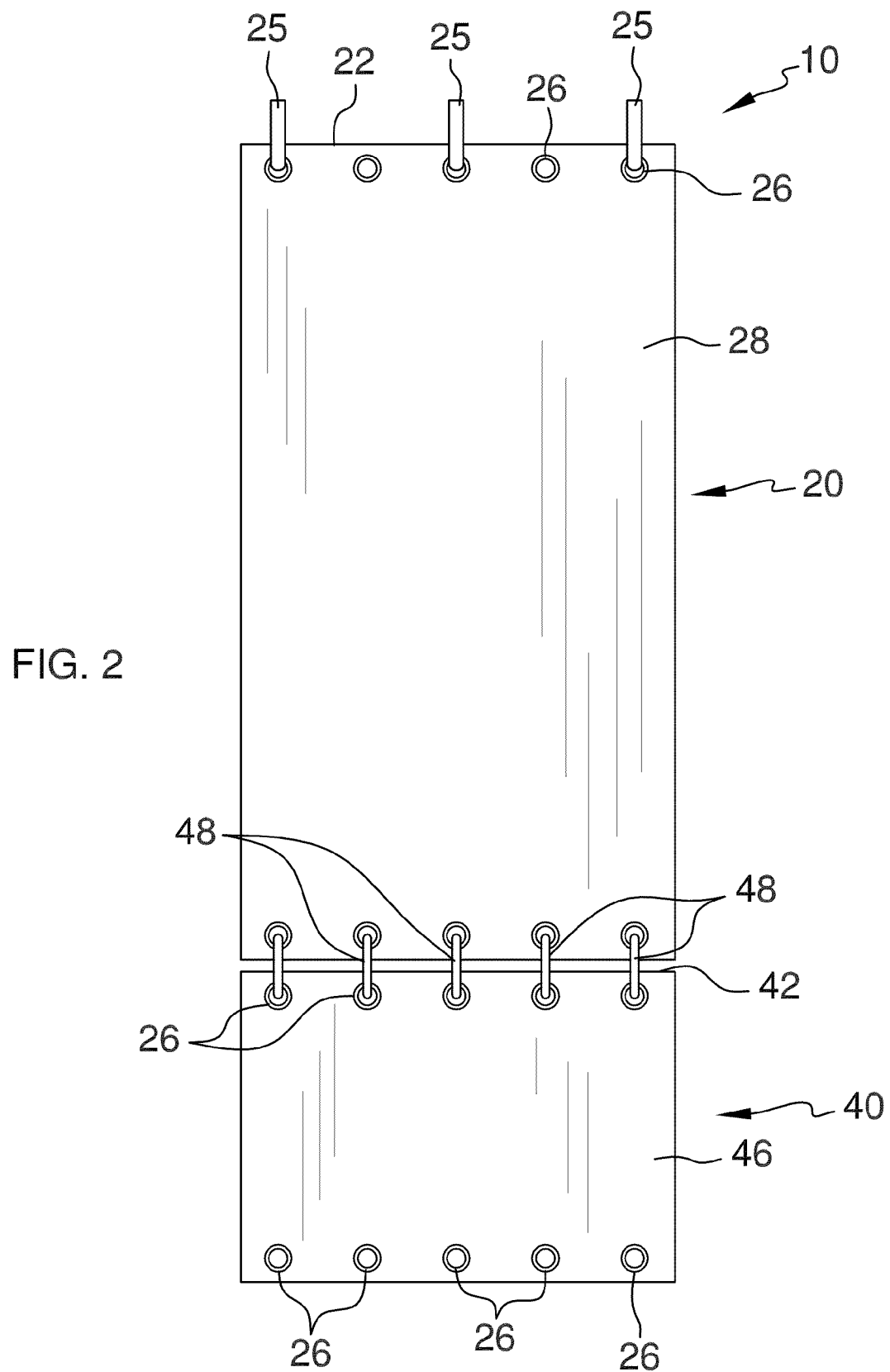
FIG. 2 is a rear elevation view.

Referring to FIGS. 1 and 2, the apparatus 10 comprises a pliable top section 20 having a material front 21 and a rubberized back 28. The top section 20 further comprises a top 22 and a bottom 23. The top section 20 has a length of about 48 inches and a width of about 24 inches. A plurality of grommets 26 is disposed adjacent to the top section 20 top 22. A plurality of grommets 26 is disposed adjacent to the top section 20 bottom 23. The grommets 26 of the top section 20 to are equal in number to the grommets 26 of the top section 20 bottom 23. A plurality of thin hooks 25 is removably inserted into the top grommets 26 such that each hook 25 is selectively hung over an existing door 80.

The pliable bottom section 40 has a length of about 24 inches, a width of about 24 inches, a material bottom section front 45 and a rubberized bottom section back 46. The bottom section 40 further comprises a bottom section top 42 spaced apart from a bottom section bottom 44. A plurality of grommets 26 is disposed adjacent to the bottom section top 42. The grommets 26 are equal in number to the grommets 26 of the top section 20 top 22 grommets 26 and bottom 23 grommets 26. A plurality of grommets 26 is disposed within the bottom section bottom 44. The grommets 26 are equal in number to the grommets 26 of the bottom section top 42.

Figure 3:
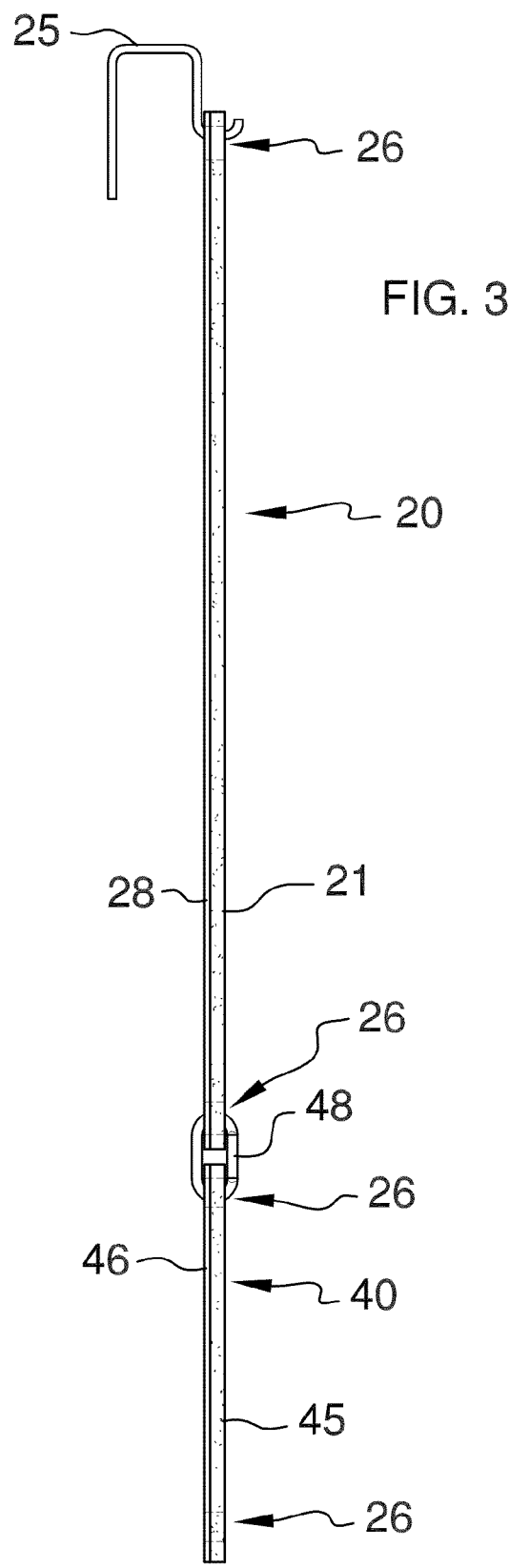
FIG. 3 is a lateral elevation view.

Continuing to refer to FIGS. 1 and 2 and referring also to FIG. 3, the plurality of carabiners 48 selectively fastens the top section 20 bottom 23 to the bottom section top 42.

Figure 4:
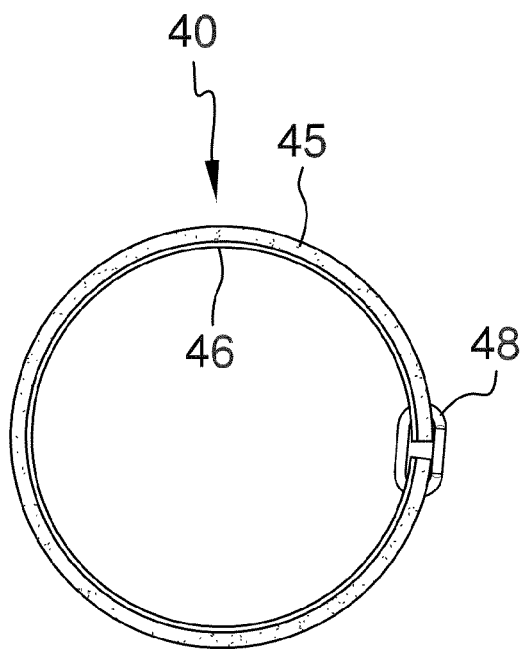
FIG. 4 is a lateral elevation view of the bottom section, rolled into a cylindrical tunnel.

Referring to FIG. 4, the carabiners 48 further selectively fasten the bottom section top 42 to the bottom section bottom 44, thereby forming a cylindrical tunnel.

Figure 5:
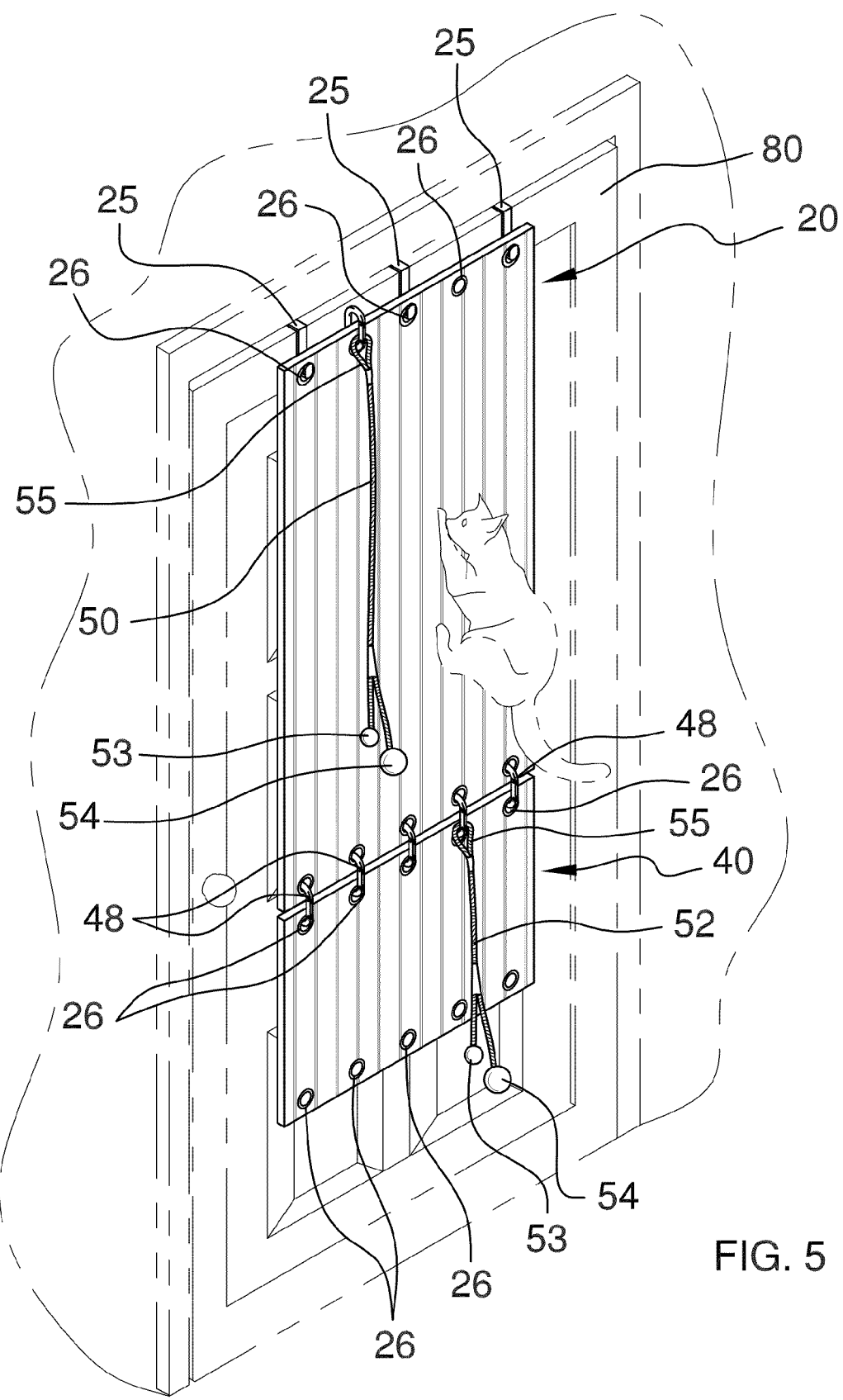
FIG. 5 is a perspective view of the apparatus in use.

Referring to FIG. 5, a pair of hanging members is provided. The hanging members comprise a first hanging member 50 and a second hanging member 52. Each hanging member has a pair of balls spaced apart from a loop 55. The balls comprise a small ball 53 and a large ball 54. Different sized balls provide even further intrigue in enticing a cat to play with the apparatus 20. Each loop 55 is selectively hung from a hook or from a carabiner 48.

With respect to the above description then, it is to be realized that the optimum dimensional relationships for the parts of the feline exercise apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the feline exercise apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the feline exercise apparatus may be used.

Therefore, the foregoing is considered as illustrative only of the principles of the feline exercise apparatus. Further, since numerous modifications and changes will readily occur to those skilled in the art, it is not desired to limit the feline exercise apparatus to the exact construction and operation shown and described, and accordingly, all suitable modifications and equivalents may be resorted to, falling within the scope of the feline exercise apparatus.

What is claimed is:

1. A feline exercise apparatus, comprising, in combination: a pliable top section having a top spaced apart from a bottom, the top section having a length of about 48 inches and a width of about 24 inches; a plurality of grommets adjacent to the top section top, the grommets having an number; a plurality of grommets adjacent to the top section bottom, the grommets having a number equal to the number of the top section top grommets; a plurality of thin hooks removably inserted into the top grommets, each hook selectively hung over an existing door; a pliable bottom section having a length of about 24 inches, a width of about 24 inches, a bottom section top spaced apart from a bottom section bottom; a plurality of grommets adjacent to the bottom section top, the grommets having a number equal to the number of the grommets of the top section bottom; a plurality of grommets within the bottom section bottom, the grommets having a number equal to the number of the grommets of the bottom section top; a plurality of carabiners selectively fastening the top section bottom to the bottom section top; a pair of hanging members comprising a first hanging member and a second hanging member, each hanging member having a pair of balls spaced apart from a loop, the balls comprising a small ball and a large ball; each loop selectively hung from a hook or from a carabiner.

* * * * *